United States Patent
Shaffer et al.

(10) Patent No.: US 7,853,001 B2
(45) Date of Patent: Dec. 14, 2010

(54) METHOD AND SYSTEM FOR PROVIDING A CAMP-ON SERVICE

(75) Inventors: Shmuel Shaffer, Palo Alto, CA (US); Shantanu Sarkar, San Jose, CA (US); Labhesh Patel, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1339 days.

(21) Appl. No.: 11/101,704

(22) Filed: Apr. 8, 2005

(65) Prior Publication Data

US 2006/0227949 A1 Oct. 12, 2006

(51) Int. Cl.
*H04M 3/42* (2006.01)
*H04L 12/66* (2006.01)

(52) U.S. Cl. .............. 379/209.01; 379/201.01; 379/210.01; 370/352

(58) Field of Classification Search ............. 379/209.01, 379/210.01, 266.01; 370/352
See application file for complete search history.

(56) References Cited

U.S. PATENT DOCUMENTS

| | | | |
|---|---|---|---|
| 3,963,874 A | 6/1976 | Pommerening et al. | 179/18 |
| 4,577,067 A | 3/1986 | Levy et al. | 179/99 |
| 4,809,321 A | 2/1989 | Morganstein et al. | 379/211 |
| 5,577,111 A | 11/1996 | Iida et al. | 379/209.01 |
| 5,809,130 A * | 9/1998 | Ayala | 379/266.01 |
| 5,812,551 A | 9/1998 | Tsukazoe et al. | 370/399 |
| 6,118,861 A | 9/2000 | Gutzmann et al. | 379/201 |
| 6,125,178 A | 9/2000 | Walker et al. | 379/211.01 |
| 6,178,237 B1 | 1/2001 | Horn | 379/202 |
| 6,453,022 B1 | 9/2002 | Weinman, Jr. | 379/88.13 |
| 6,501,750 B1 | 12/2002 | Shaffer et al. | 370/353 |
| 6,510,162 B1 | 1/2003 | Fijolek et al. | 370/432 |
| 6,546,087 B2 | 4/2003 | Shaffer et al. | 379/90.01 |
| 6,567,505 B1 | 5/2003 | Omori et al. | 379/84 |
| 6,601,099 B1 | 7/2003 | Corneliussen | 709/224 |
| 6,614,899 B1 | 9/2003 | Sollee et al. | 379/218.01 |
| 6,615,236 B2 | 9/2003 | Donovan et al. | 709/203 |
| 6,618,476 B1 | 9/2003 | Szeto et al. | 379/198 |
| 6,625,141 B1 | 9/2003 | Glitho et al. | 370/352 |
| 6,636,594 B1 | 10/2003 | Oran | 379/201.01 |

(Continued)

OTHER PUBLICATIONS

U.S. Appl. No. 10/993,681, filed Nov. 19, 2004, entitled *System and Method for Providing an eCamp Feature in a Session Initiation Protocol (SIP) Environment*, 37 pages specification, claims and abstract, 6 pages of drawings, inventors Denise G. Caballero-McCann et al, Nov. 10, 2004.

(Continued)

*Primary Examiner*—Fang Tsang
*Assistant Examiner*—Oleg Asanbayev
(74) *Attorney, Agent, or Firm*—Baker Botts L.L.P.

(57) ABSTRACT

A method for providing a camp-on service includes receiving from a caller a request to communicate with a called party via a first communication method and notifying the caller that the called party is currently communicating on a first call via the first communication method. The method includes receiving from the caller a request to camp-on to the called party and an indication that the caller can be reached via a second communication method. The method also includes determining that the first call involving the called party has terminated.

25 Claims, 2 Drawing Sheets

U.S. PATENT DOCUMENTS

| | | | |
|---|---|---|---|
| 6,658,095 B1 | 12/2003 | Yoakum et al. | 379/93.01 |
| 6,661,799 B1 | 12/2003 | Molitor | 370/401 |
| 6,665,396 B1 | 12/2003 | Khouri et al. | 379/266.01 |
| 6,665,723 B2 | 12/2003 | Trossen | 709/227 |
| 6,678,735 B1 | 1/2004 | Orton et al. | 709/230 |
| 6,684,147 B2 | 1/2004 | Park et al. | 701/71 |
| 6,694,008 B1 | 2/2004 | Mukherji et al. | 379/228 |
| 6,731,625 B1 | 5/2004 | Eastep et al. | 370/352 |
| 6,738,390 B1 | 5/2004 | Xu et al. | 370/467 |
| 6,751,310 B1 | 6/2004 | Crossley | 379/266 |
| 6,754,181 B1 | 6/2004 | Elliott et al. | 370/252 |
| 6,760,322 B1 | 7/2004 | Fukuda et al. | 370/352 |
| 6,785,246 B2 | 8/2004 | Foti | 370/261 |
| 6,785,560 B1 | 8/2004 | Chow et al. | 455/564 |
| 6,788,676 B2 | 9/2004 | Partanen et al. | 370/352 |
| 6,970,547 B2 | 11/2005 | Andrews et al. | 379/210.01 |
| 7,006,618 B1 | 2/2006 | Shaffer et al. | 379/215.01 |
| 7,480,260 B1* | 1/2009 | Vashisht et al. | 370/260 |
| 2002/0078150 A1 | 6/2002 | Thompson et al. | 709/204 |
| 2003/0081752 A1* | 5/2003 | Trandal et al. | 379/210.01 |
| 2004/0062383 A1 | 4/2004 | Sylvain | 379/265.06 |
| 2004/0203660 A1 | 10/2004 | Tibrewal et al. | 455/414.1 |
| 2005/0238162 A1 | 10/2005 | Dezonno | 379/265.09 |
| 2006/0007954 A1 | 1/2006 | Agrawal et al. | 370/466 |

OTHER PUBLICATIONS

Office Action for U.S. Appl. No. 11/271,710, (20 pages), Apr. 1, 2009.
Office Action for U.S. Appl. No. 10/993,681, (17 pages), Feb. 20, 2009.
Office Action for U.S. Appl. No. 09/990,688, (5 pages), Jun. 7, 2005.
Office Action for U.S. Appl. No. 09/990,688, (3 pages), Jan. 21, 2005.
Office Action for U.S. Appl. No. 09/990,688, (9 pages), Nov. 2, 2004.
Office Action for U.S. Appl. No. 09/990,688, (7 pages), Jul. 30, 2004.
Office Action for U.S. Appl. No. 09/990,688, (8 pages), Feb. 2, 2004.
Shaffer et al, U.S. Appl. No. 10/993,681, filed Nov. 19, 2004, Communication from the U.S. Patent and Trademark Office mailed Jan. 21, 2010.
Final Office Action for U.S. Appl. No. 10/993,681, (9 pages), Aug. 20, 2009.
Shaffer, et al., "Method and System for Providing a Camp-On Hold Service," U.S. Appl. No. 11/271,710, filed Nov. 11, 2005, publication 2007-0121878 dated May 31, 2007.
PCT Notification of Transmittal of the International Search Report and the Written Opinion of the International Searching Authority, or the Declaration mailed Aug. 8, 2007, re PCT/US06/39367 filed Oct. 6, 2006.
Mahy, et al., "The Session Initiation Protocol (SIP) 'Join' Header," The Internet Society, RFC 3991, http://www.ietf.org/rfc/rfc3911.txt, 15 pgs, Oct. 2004.
Mahy, et al., "The Session Initiation Protocol (SIP) 'Replaces' Header," The Internet Society, RFC 3891, http://www.ietf.org/rfc/rfc3891.txt, 15 pgs, Sep. 2004.
Soroushnejad, et al. "Implementing Bridged Line Appearances (BLA) Using Session Initiation Protocol (SIP)," Internet Draft http://bgp.potaroo.net/ ietf/html/ids/draft-anil-sipping-bla-03.txt, 33 pgs, Jun. 2006.
Rosenberg et al., "An INVITE Initiated Dialog Event Package for the Session Initiation Protocol (SIP)," RFC 4235, http://ietfreport.isoc.org/idref/draft-ietf-sipping- dialog-package-06.txt, 38 pgs, Apr. 2005.
Mahy et al., "Remote Call Control in SIP using the REFER method and the session-oriented dialog package," Internet Draft (no longer posted on Internet), The Internet Society, 35 pgs (Feb. 2004).
Mahy et al., "Remote Call Control in Session Initiation Protocol (SIP) using the REFER method and the session-oriented dialog package," Internet Draft, http://www.ietf.org/internet-drafts/draft-mahy-sip-remote-cc-03.txt, The Internet Society, 14 pgs (Mar. 2006).
Schulzrinne, et al., "Session Initiation Protocol (SIP)-H.323 Interworking Requirements," RFC 4123, 15 pages, Jul. 2005.
Rosenberg, et al., "An Offer/Answer Model with the Session Description Protocol (SDP)," RFC 3264, 24 pages, Jun. 2002.
Rosenberg, et al., Caller Preferences for the "Session Initiation Protocol (SIP)," RFC 3841, 25 pages, Aug. 2004.
Schulzrinne, et al., "RTP Payload of DTMF Digits, Telephony Tones and Telephony Signals," RFC 2833, 27 pages, May 2000.
Roach, "Session Initiation Protocol (SIP)-Specific Event Notification," RFC 3265, 34 pages, Jun. 2005.
Rosenberg, et al., "SIP: Session Initiation Protocol ," Network Working Group, RFC 3261, 269 pages, Jun. 2002.

* cited by examiner

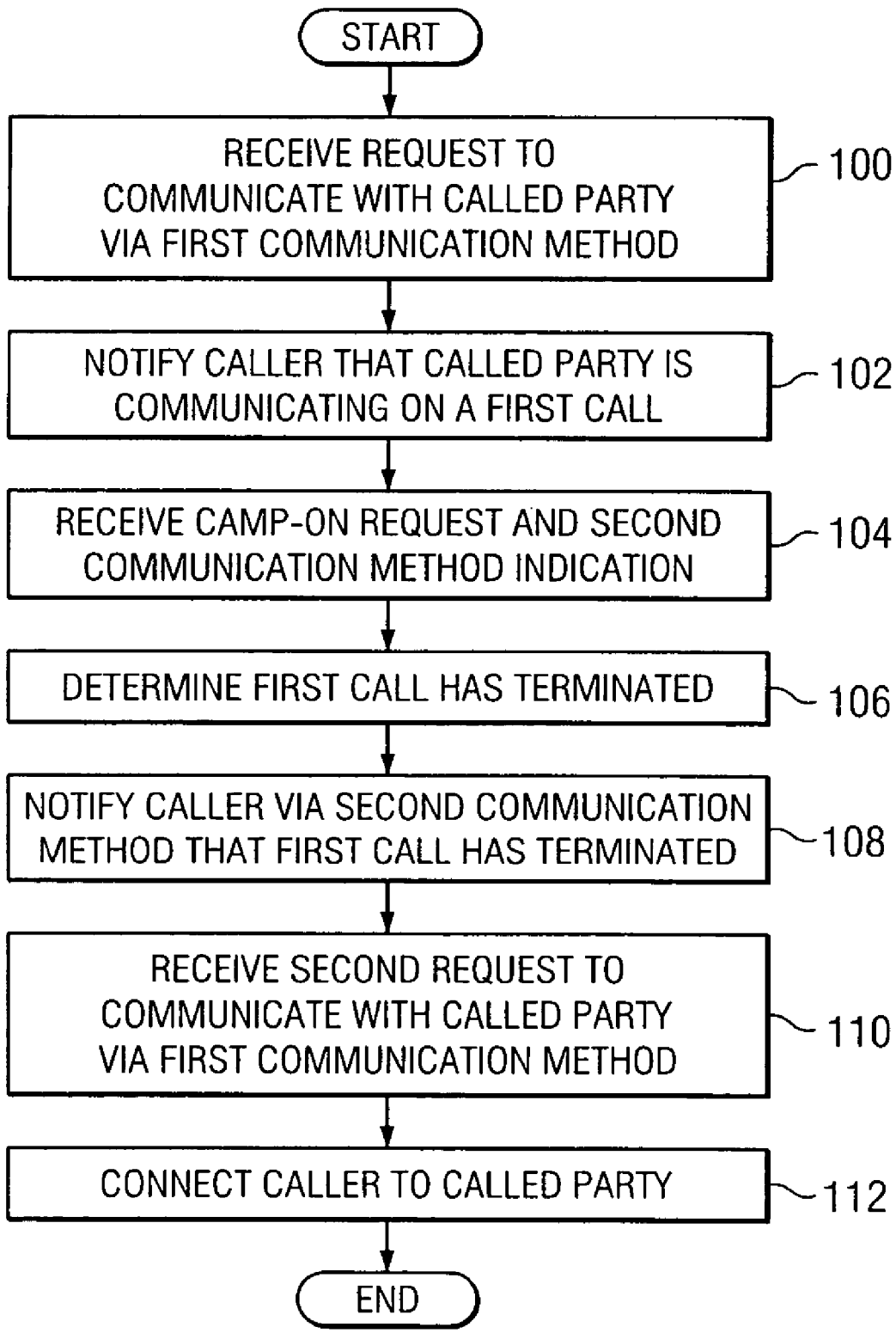

METHOD AND SYSTEM FOR PROVIDING A CAMP-ON SERVICE

TECHNICAL FIELD OF THE INVENTION

This invention relates in general to communication systems and, more particularly, to a method and system for providing a camp-on service.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies (e.g. Instant Messaging, cellular communications, simple voice sessions, etc.) that exist in the current marketplace.

Camp-on is a common feature in many systems today, such as Private Branch exchanges (PBXs). This feature allows a caller who calls an individual whose line is busy to have her phone connected to the called party when the called party completes his call. When the called party hangs up, the system rings and/or alerts the called party of the caller's call. Some instant messaging (IM) systems allow users to transmit instant messages to users who are not logged in. Some IM systems also notify users whenever a "buddy" on a particular buddy list logs in or out.

Problems arise when the camping party needs to go to a meeting while the called party has not yet freed up. With some systems, the only available solution for the camping party is to revoke the camp-on request. If the calling party fails to revoke the camp-on request, the system attempts to connect the called party with the office of the calling party and gets a ring-no answer from the calling party.

SUMMARY OF THE INVENTION

The present invention provides a method and system for providing a camp-on service that substantially eliminates or reduces at least some of the disadvantages and problems associated with previous methods and systems.

In accordance with a particular embodiment of the present invention, a method for providing a camp-on service includes receiving from a caller a request to communicate with a called party via a first communication method and notifying the caller that the called party is currently communicating on a first call via the first communication method. The method includes receiving from the caller a request to camp-on to the called party and an indication that the caller can be reached via a second communication method. The method also includes determining that the first call involving the called party has terminated.

The method may include notifying the caller via the second communication method that the first call involving the called party has terminated, receiving from the caller a second request to communicate with the called party via the first communication method and connecting the caller to the called party. The method may include notifying the called party that the caller has attempted to call the called party and that the caller may be reached via the second communication method. The first communication method may comprise voice communication, and the second communication method may comprise instant messaging communication. In some cases, the first communication method may comprise voice communication, and the second communication method may comprise e-mail communication.

In accordance with another embodiment, a system for providing a camp-on service includes an interface operable to receive from a caller a request to communicate with a called party via a first communication method. The system includes a processor coupled to the interface and operable to notify the caller that the called party is currently communicating on a first call via the first communication method. The interface is operable to receive from the caller a request to camp-on to the called party and an indication that the caller can be reached via a second communication method. The processor is operable to determine that the first call involving the called party has terminated.

Technical advantages of particular embodiments of the present invention include methods and systems that enable a voice caller to camp-on to another party who may be currently on a call and to be notified using another communication method, such as instant messaging (IM), when the called party becomes available. Thus, the caller can still utilize the camp-on feature even if the caller is going to be away from his phone or otherwise unable to access his normal endpoint when the call on which the called party is communicating terminates. In addition, in some embodiments a called party currently on a call may be notified through another communication method of a camp-on request of another party trying to reach the called party. Thus, different methods of communication are integrated to provide camp-on features. This saves time for parties utilizing camp-on functionality and also avoids waste of system resources that may otherwise be used to try and reach an user of the camp-on system who is unavailable to access certain communication endpoints.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 illustrates a method for providing a camp-on service, in accordance with an embodiment of the present invention.

DETAILED DESCRIPTION OF THE INVENTION

Figure 1:
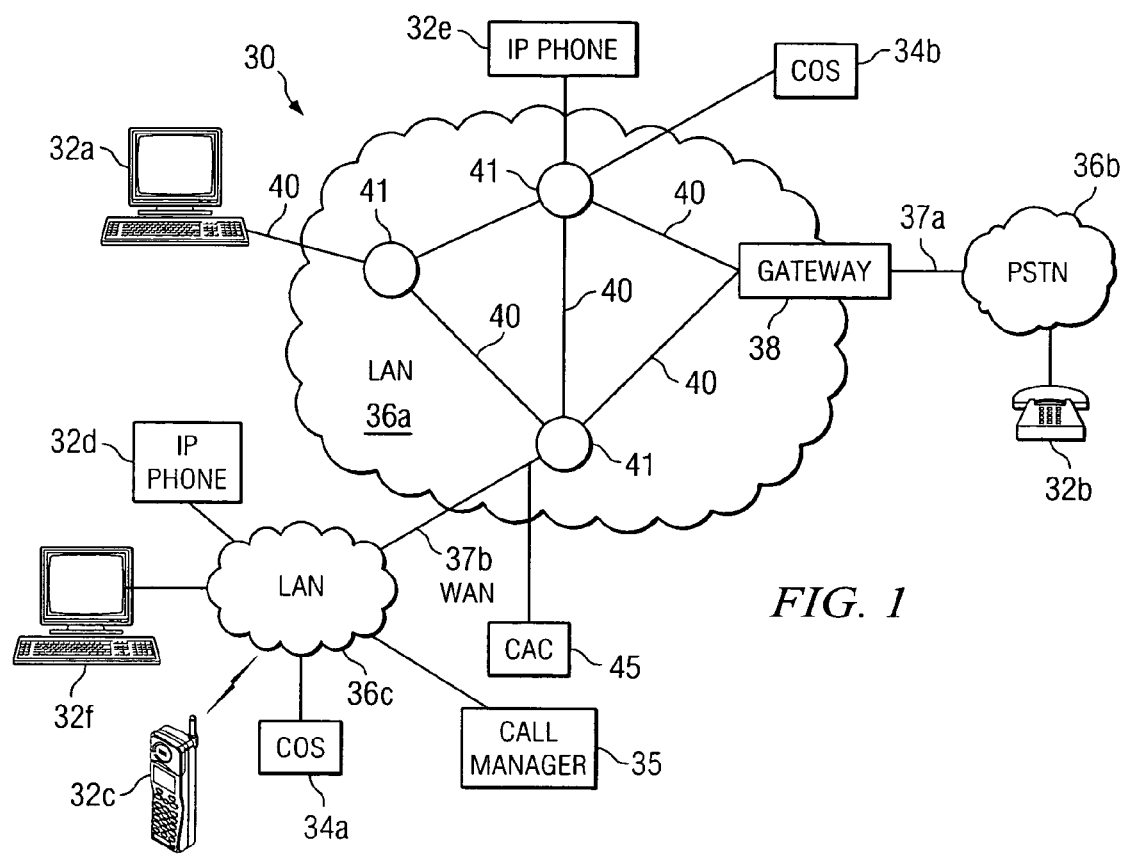
FIG. 1 illustrates a communication system including a plurality of endpoints operable to communicate among each other and a plurality of camp-on systems, in accordance with a particular embodiment of the present invention.

FIG. 1 illustrates a communication system 30 including a plurality of endpoints 32a-32f having the ability to establish communication sessions between each other and/or camp-on systems (COSs) 34a-34b, using one or more of communication networks 36a-36c. Camp-on systems 34 enable callers who call another party whose line is busy to have the caller "camp-on" to the called party such that the called party is automatically alerted of the caller's call when the called party completes their call. When the called party's current call is terminated, the camp-on system automatically rings and/or alerts the called party of the caller's call so that they may be connected. Calls shall include requests for communication transmitted using any audio and/or video means, including signals, data or messages transmitted through voice devices, text chat, web sessions, facsimile, instant messaging and e-mail.

In particular embodiments, a caller communicating over one endpoint 32a-32f attempting to camp-on to another party who may be currently on a call using another such endpoint may indicate a request to a camp-on system 34 to be notified using a particular communication method, such as instant messaging (IM), when the called party becomes available. Thus, the caller can still utilize the camp-on feature even if the caller is going to be away from his phone or otherwise unable to access his normal endpoint when the call on which the called party is communicating terminates.

In the illustrated embodiment, communication network 36a is a local area network (LAN) that enables communication between a plurality of endpoints 32a-32f, camp-on systems 34a-34b and call manager 35 distributed across multiple cities and geographic regions. Communication network 36b is a public switched telephone network (PSTN) and couples endpoint 32b with communication network 36a through gateway 38. Communication network 36c is another LAN, which couples endpoints 32c, 32d, 32f, camp-on system 34a and call manager 35 with communication network 36a. Accordingly, users of endpoints 32a-32f, camp-on systems 34a-34b and call manager 35 can establish communication sessions between and among each network component coupled for communication with one or more of networks 36a-36c. Communication links 37a and 37b couple communication networks 36a and 36b, and communication networks 36a and 36c, respectively. In the illustrated embodiment, communication link 37b is a wide area network (WAN), which couples LANs 36a and 36c. A call admission control (CAC) system 45 may be used to monitor and police the bandwidth available over WAN 37b.

In the illustrated embodiment, communication system 30 includes call manager 35 that maintains information on users of system 30 and facilitates communication among users. For example, call manager 35 may monitor endpoints of the communication system and transmit information regarding the status of various endpoints and/or calls. Call manager 35 may also provide other functionality typically provided by call managers in current communication systems.

Communication network 36a includes a plurality of segments 40 and nodes 41 that couple endpoints 32a and 32e with camp-on system 34b, gateway 38, and communication networks 36b-36c. Therefore, a user of endpoint 32a is provided with access to endpoints 32b-32f and camp-on systems 34a-34b. Nodes 41 may include any combination of network components, gatekeepers, call managers, conference bridges, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. In addition, communication networks in accordance with various embodiments may include any number of Private Branch exchanges (PBXs) with camp-on functionality. Generally, network 36a provides for the communication of packets, cells, frames, or other portions of information (generally referred to as packets herein) between endpoints 32a-32f. Communication network 36a may include any number and combination of segments 40, nodes 41, endpoints 32a-32f, and/or camp-on systems 34a-34b.

In a particular embodiment, communication network 36a employs voice communication protocols that allow for the addressing or identification of endpoints, nodes, and/or camp-on servers coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packet, are included within the scope of the present invention.

Network 36a may be directly coupled to other IP networks including, but not limited to, another LAN or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoints 32a and 32c-32f, camp-on systems 34a-34b, and gateway 38 may comprise IP telephony devices capable of participating in IM, video, and other multimedia communication sessions. IP telephony devices have the ability of encapsulating a user's voice (or other input) into IP packets so that the voice can be transmitted over network 36a. IP telephony devices may include telephones, fax machines, computers running telephony software, nodes, gateways, wired or wireless devices, hand held PDAS, or any other device capable of performing telephony functions over an IP network.

In particular embodiments, communication system 30 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32f, camp-on systems 34a-34b, call manager 35 and/or gateway 38 may be any combination of hardware, software, and/or encoded logic that provides communication services to a user. For example, endpoints 32a-32f may include a telephone, a computer running telephony software, a video monitor, a camera, an IP phone, a cell phone or any other communication hardware, software and/or encoded logic that supports the communication of packets of media (or frames) using communication network 36a. Endpoints 32a-32f may also include unattended or automated systems, gateways, other intermediate components or other devices that can establish media sessions. Although FIG. 1 illustrates a particular number and configuration of endpoints, camp-on systems, segments, nodes, and gateways, communication system 30 contemplates any number or arrangement of such components for communicating media. In addition, elements of communication system 30, such as camp-on system 34a, may include components centrally located (local) with respect to one another or distributed throughout communication system 30.

Figure 2:
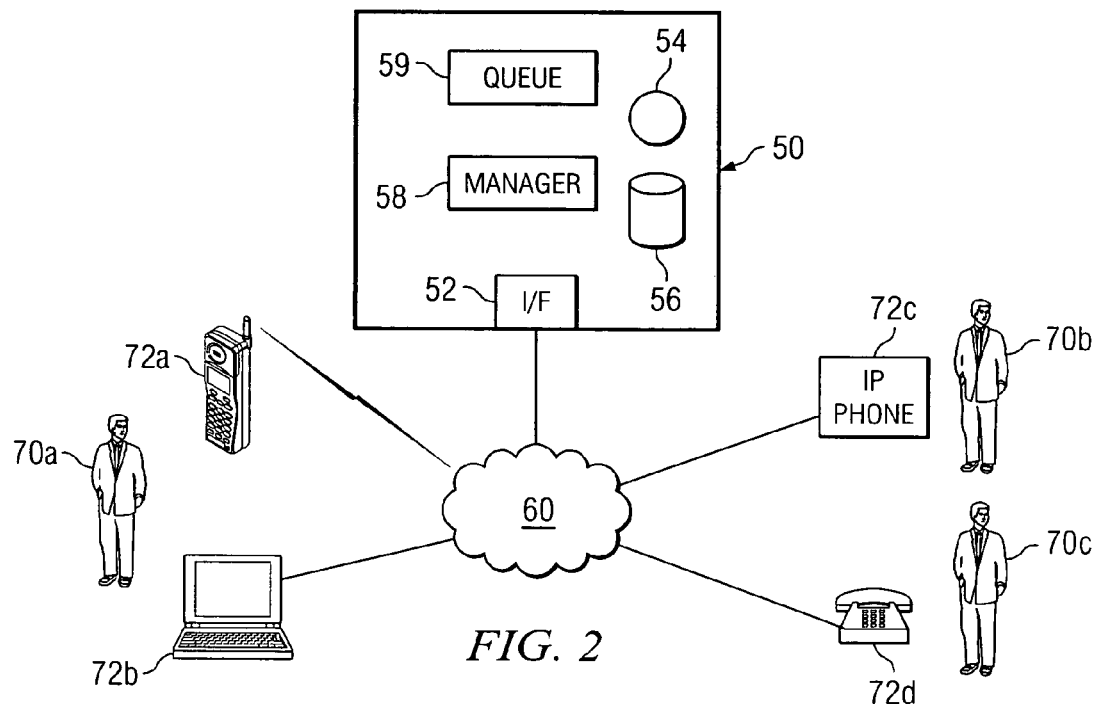
FIG. 2 illustrates a camp-on system in more detail, illustrating aspects of the present invention.

FIG. 2 illustrates a camp-on system 50 in more detail, in accordance with a particular embodiment of the present invention. Camp-on system 50 may be similar to camp-on systems 34 illustrated in FIG. 1. In the illustrated embodiment, camp-on system 50 includes an interface 52, a processor 54, memory module 56, a manager 58 and a queue 59.

Interface 52 couples camp-on system 50 with communication system 60 and is operable to receive communications from and transmit communications to communication system 60. Processor 54 may be a microprocessor, controller, or any other suitable computing device, resource, or combination of hardware, software and/or encoded logic. Processor 54 may perform camp-on, notification and connection functionality described herein with respect to particular embodiments. Memory module 56 may include logic embodied in a computer readable medium and may be any form of volatile or non-volatile memory including, without limitation, magnetic media, optical media, random access memory (RAM), read-only memory (ROM), removable media, or any other suitable local or remote memory component. Memory module 56 may store any suitable information to implement features of various embodiments, such as camp-on notification instructions as described herein.

Manager 58 maintains information on users of communication system 60 and camp-on system 50 and facilitates communication among users. Manager 58 may comprise any combination of hardware, software, and/or encoded logic. In particular embodiments, manager 58 may maintain a listing, table or other organization of information about users. The information may include a name or other identifier for each user. The information may also include contact information such as phone numbers, and IM, SMS and email addresses for the users.

Queue 59 stores camp-on submissions from callers requesting to communicate with other users currently on the phone or otherwise in communication with other users. In some cases, a called party currently on a call may have more than one pending camp-on request (from more than one caller) at one time. Queue 59 may comprise any combination of hardware, software, and/or encoded logic.

In the illustrated embodiment, camp-on system 50 is coupled to endpoints 72 through communication system 60. Communication system 60 may include one or more communication networks and other suitable components as described above with respect to communication system 30 of FIG. 1.

Users 70 are associated with camp-on system 50 and use endpoints 72 for communication with other parties and camp-on system 50. Endpoints 72 may be similar to one or more of the endpoints described above with respect to FIG. 1. Some users 70 may utilize more than one endpoint for such communication. For example, some users may utilize a cell phone, IP phone or telephone for audio communications with other users or camp-on system 50 and another type of endpoint, such as a PDA or computer, for IM communications with other users or camp-on system 50. Other users, however, may use one type of endpoint, such as a cell phone, IP phone or computer for all types of communication with other users or camp-on system 50. For example, in the illustrated embodiment user 70a currently has access to endpoints 72a (cell phone) and 72b (computer), user 70b has access to endpoint 72c (IP phone) and user 70c has access to endpoint 72d (phone).

As indicated above, particular embodiments provide a user with the ability to camp-on for communication using one communication method, such as voice communication, while providing options to be notified of a called party's availability using another communication method, such as IM or SMS. As an example in operation, assume that user 70b is using endpoint 72c to communicate on a voice call with user 70c who is using endpoint 72d. User 70a would like to communicate with user 70b. User 70a uses endpoint 72a to call user 70b at endpoint 72c. However, user 70a receives an indication that user 70b is currently on a call. This indication may come from processor 54 of camp-on system 50 or from another suitable component, such as a call manager, that is coupled to or a part of communication system 60. User 70a communicates a desire to camp-on to user 70b such that user 70a is connected, through, for example, endpoint 72a, to user 70b once the call between user 70b and user 70c has terminated. In a normal camp-on situation, user 70a would receive a call, for example at endpoint 72a from a camp-on system, when the call between user 70b and user 70c terminated. This call would connect, or lead to a connection of, users 70a and 70b.

However, in this example user 70a may need to be away from an endpoint that he can use to receive the call from the camp-on system once the call between users 70b and 70c terminates. Particular embodiments provide user 70a with the ability to notify camp-on system 50 that user 70a may be unable to access 72a when user 70b's call terminates but that user 70a may be reached via IM or another communication method, such as e-mail or SMS. Such notification may be made via the web, e-mail, IM, SMS, DTMF signal or any other communication method.

For example, if user 70a is going to be unable to access endpoint 72a, he may notify camp-on system 50 that he may be reached via an IM or SMS account which he may access at, for example, endpoint 72b. Thus, when the call between users 70b and 70c terminates, camp-on system is notified of such termination, for example from endpoint 72c of user 70b or from another component of communication system 60 such as a call manager, and sends a message to user 70a notifying him that the call that user 70b was on has terminated. As indicated above, this message may be sent to user 70a according to his stated desires through any suitable communication method, such as via an IM or SMS that user 70a receives at endpoint 72b. User 70a may receive the message at any suitable endpoint to which user 70a has access. Once user 70a has been notified through, for example, IM that user 70b's call has terminated, user 70a may call user 70b or may call camp-on system 50 or another system which may itself call or connect user 70b with user 70a through a bridging or other connection function.

In particular embodiments, user 70a may have preferences saved with camp-on system 50 (e.g., in memory module 56 or manager 58) to instruct camp-on system how to act if user 70a is unavailable after camping-on to another party. For example, assume that user 70a camps-on to 70b, and camp-on system 50 calls user 70a at endpoint 72a to connect user 70a with user 70b when user 70b's call terminates. If user 70a does not answer then camp-on system may follow previous instructions submitted by user 70a and notify user 70a that user 70b is free using those instructions. As an example, the instructions may direct camp-on system 50 to notify user 70a via IM (that user may access using endpoint 72b) that user 70b's call has terminated. Thus, some embodiments allow a user to submit preferences allowing a user who has camped-on to another party to be notified via an alternative communication method of the termination of the called party's call only if the user does not answer the call made after the called party becomes available. After user 70a has been notified that user 70b is free, user 70a may call user 70b directly or may call camp-on system 50 or another system to be connected to user 70b.

In some embodiments, camp-on system 50 may not notify user 70a that the call between user 70b and 70c has terminated. Instead, camp-on system 50 may notify user 70b through any suitable method that user 70a attempted to camp-on to user 70b but may now be reached via IM or other communication method indicated to camp-on system 50 by user 70a.

In particular embodiments, once user 70b's call with user 70c has terminated, camp-on system 50 may call user 70b at endpoint 72c and notify user 70b that user 70a is trying to reach him. Camp-on system 50 may request that user 70b wait for user 70a to join the call and may, for example, place user 70b on hold. Camp-on system 50 may also notify user 70a, for example through IM or any other communication method previously selected by user 70a, that user 70b is ready to communicate with user 70a. Camp-on system 50 may provide user 70a with a number to call in order to be bridged with user 70b. In some cases, camp-on system 50 may provide user 70a with a password or other ID information to utilize with the number to connect with user 70b. When user 70a calls the number (e.g., using endpoint 72a), user 70a may be connected with user 70b. In some cases camp-on system 50 may include a bridge function to connect endpoints 72a and 72c through camp-on system 50 so that users 70a and 70b may communicate.

As indicated above, particular embodiments provide the ability for a caller to be notified via an alternative method of communication when a party to whom the caller has camped-on is through with a call. In addition, in particular embodiments camp-on system 50 may receive a camp-on request from user 70a trying to reach user 70b who is on the phone (e.g., with user 70c) and may notify user 70b of user 70a's camp-on request through an alternative communication method such as e-mail, IM or SMS. Similar to the manner in which user 70a may provide instructions to the system regarding notification that user 70b is through with his call, user 70b may provide instructions to the system to notify user 70b when a party has camped-on to user 70b (i.e., camped-on to his related endpoint) while user 70b is on a call. Such instructions may include a particular method of communication through which user 70b will be notified of the camp-on request of user 70a. This may ensure that user 70b does not immediately leave his office or endpoint once his current call with user 70c has terminated, thus facilitating communication between user 70a and user 70b.

It will be recognized by those of ordinary skill in the art that camp-on system 50 is merely one example configuration of a camp-on system for providing a camp-on service, in accordance with an embodiment of the present invention. Other camp-on systems may include any number of interfaces, managers, processors, memory modules, queues and/or other components to accomplish the functionality and features described herein. For example, although camp-on system 50 is illustrated and described as including interface 52, processor 54, memory module 56, manager 58 and queue 59, these components and other desired components for performing the above described functionality may be centrally located (local) with respect to one another, or distributed throughout communication system 60.

FIG. 3 is a flowchart illustrating a method for providing a camp-on service, in accordance with an embodiment of the present invention. The method begins at step 100 where a request is received from a caller to communicate with a called party via a first communication method. For example, a caller may use a phone, such as an IP phone, to dial another party. At step 102, the caller is notified that the called party is currently communicating on a first call via the first communication method. For example, the called party may be speaking to another party using the phone that the original caller attempted to call. The notification may be sent to the caller in any suitable manner, such as a busy signal or voice message.

At step 104, a request is received from the caller requesting that the caller camp-on to the called party. At step 104, an indication is also received that the caller may be reached via a second communication method once the called party to whom the caller desires to camp-on is off their call. For example, if the caller is going to be away from their office such that the caller might not be available once the called party is through with their call, the caller can leave instructions that the caller may be reached by IM or e-mail. At step 106, it is determined that the called party's first call has terminated.

At step 108, the caller is notified via the second communication method that the called party's first call has terminated. For example, a camp-on system may transmit an IM or SMS notification pursuant to the caller's instructions. At step 110 a second request to communicate with the called party via the first communication method is received, and at step 112 the caller is connected to the called party. For example, when the caller is notified via the second communication method that the called party's first call has terminated, the caller may use his phone to again call the called party knowing that the called party should now be available.

As discussed above, in some cases a system may notify the called party that the caller has attempted to call the called party while the called party was on the first call and that the caller may be reached via the second communication method pursuant to the caller's instructions with the system. In some cases a system may notify the called party that the caller has attempted to call the called party, place the called party on hold, notify the caller via the second communication method that the called party is available, receive from the caller a second request or call to communicate with the called party via the first communication method and connect the caller to the called party.

Some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments include methods and systems that enable a voice caller to camp-on to another party who may be currently on a call and to be notified using another communication method, such as instant messaging (IM), when the called party becomes available. Thus, the caller can still utilize the camp-on feature even if the caller is going to be away from his phone or otherwise unable to access his normal endpoint when the call on which the called party is communicating terminates. Thus, different methods of communication are integrated to provide camp-on features. This saves time for parties utilizing camp-on functionality and also avoids waste of system resources that may otherwise be used to try and reach an user of the camp-on system who is unavailable to access certain communication endpoints.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and camp-on system 50, these elements may be combined, rearranged or positioned in order to accommodate particular routing architectures or needs. In addition, any of these elements may be provided as separate external components to communication system 30, camp-on system 50 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for providing a camp-on service, comprising:
   receiving from a caller a request to communicate with a called party via a first communication method;
   notifying the caller that the called party is currently communicating on a first call via the first communication method;
   receiving from the caller:
      a request to camp-on to the called party; and
      an indication outside of a voicemail message that the caller can be reached via a second communication method;
   determining that the first call involving the called party has terminated; and notifying the called party by using non-voice message that:
   the caller has attempted to call the called party; and
   the caller may be reached via the second communication method.

2. The method of claim 1, further comprising:
   notifying the caller via the second communication method that the first call involving the called party has terminated;
   receiving from the caller a second request to communicate with the called party via the first communication method; and
   connecting the caller to the called party.

3. A method for providing a camp-on service, comprising:
   receiving from a caller a request to communicate with a called party via a first communication method;
   notifying the caller that the called party is currently communicating on a first call via the first communication method;
   receiving from the caller:
      a request to camp-on to the called party; and
      an indication outside of a voicemail message that the caller can be reached via a second communication method;
   determining that the first call involving the called party has terminated;
   notifying the called party by using non-voice message that the caller has attempted to call the called party;
   placing the called party on hold;
   notifying the caller via the second communication method that the called party is available;
   receiving from the caller a second request to communicate with the called party via the first communication method; and connecting the caller to the called party.

4. The method of claim 3:
   further comprising providing the caller with a number to reach the called party; and
   wherein receiving from the caller a second request to communicate with the called party via the first communication method comprises receiving from the caller through the number a second request to communicate with the called party via the first communication method.

5. The method of claim 4:
   further comprising providing the caller with an ID to reach the called party; and
   wherein receiving from the caller through the number a second request to communicate with the called party via the first communication method comprises receiving from the caller through the number and the ID a second request to communicate with the called party via the first communication method.

6. The method of claim 1, further comprising:
   calling the caller via the first communication method to connect the caller to the called party; and
   if the caller does not answer:
      notifying the caller via the second communication method that the first call involving the called party has terminated;
      receiving from the caller a second request to communicate with the called party via the first communication method; and
      connecting the caller to the called party;
   if the caller answers, connecting the caller to the called party.

7. The method of claim 1, wherein the first communication method comprises voice communication and the second communication method comprises instant messaging communication.

8. The method of claim 1, wherein the first communication method comprises voice communication and the second communication method comprises e-mail communication.

9. The method of claim 1, wherein the first communication method comprises voice communication and the second communication method comprises short message service communication.

10. A system for providing a camp-on service, comprising:
   an interface operable to receive from a caller a request to communicate with a called party via a first communication method;
   a processor coupled to the interface, the processor operable to notify the caller that the called party is currently communicating on a first call via the first communication method;

the interface operable to receive from the caller:
  a request to camp-on to the called party; and
  an indication outside of a voicemail message that the caller can be reached via a second communication method;
the processor operable to determine that the first call involving the called party has terminated; and
wherein the processor is further operable to notify the called party by using non-voice message that:
  the caller has attempted to call the called party; and
  the caller may be reached via the second communication method.

11. The system of claim 10, wherein:
the processor is further operable to notify the caller via the second communication method that the first call involving the called party has terminated;
the interface is further operable to receive from the caller a second request to communicate with the called party via the first communication method; and
the processor is further operable to connect the caller to the called party.

12. A system for providing a camp-on service, comprising:
an interface operable to receive from a caller a request to communicate with a called party via a first communication method;
a processor coupled to the interface, the processor operable to notify the caller that the called party is currently communicating on a first call via the first communication method;
the interface operable to receive from the caller:
  a request to camp-on to the called party; and
  an indication outside of a voicemail message that the caller can be reached via a second communication method;
the processor operable to determine that the first call involving the called party has terminated;
the processor is further operable to:
notify the called party by using non-voice message that the caller has attempted to call the called party;
  place the called party on hold; and
  notify the caller via the second communication method that the called party is available;
the interface is further operable to receive from the caller a second request to communicate with the called party via the first communication method; and
the processor is further operable to connect the caller to the called party.

13. The system of claim 12, wherein:
the processor is further operable to provide the caller with a number to reach the called party; and
the processor operable to receive from the caller a second request to communicate with the called party via the first communication method comprises the processor operable to receive from the caller through the number a second request to communicate with the called party via the first communication method.

14. The system of claim 13, wherein:
the processor is further operable to provide the caller with an ID to reach the called party; and
the processor operable to receive from the caller through the number a second request to communicate with the called party via the first communication method comprises the processor operable to receive from the caller through the number and the ID a second request to communicate with the called party via the first communication method.

15. The system of claim 10, wherein the processor is further operable to:
call the caller via the first communication method to connect the caller to the called party; and
if the caller does not answer:
  notify the caller via the second communication method that the first call involving the called party has terminated;
  receive from the caller a second request to communicate with the called party via the first communication method; and
  connect the caller to the called party,
if the caller answers, connect the caller to the called party.

16. The system of claim 10, wherein the first communication method comprises voice communication and the second communication method comprises instant messaging communication.

17. The system of claim 10, wherein the first communication method comprises voice communication and the second communication method comprises e-mail communication.

18. The system of claim 10, wherein the first communication method comprises voice communication and the second communication method comprises short message service communication.

19. A system for providing a camp-on service, comprising:
means for receiving from a caller a request to communicate with a called party via a first communication method;
means for notifying the caller that the called party is currently communicating on a first call via the first communication method;
means for receiving from the caller:
  a request to camp-on to the called party;
  an indication outside of a voicemail message that the caller can be reached via a second communication method; and
means for determining that the first call involving the called party has terminated; and
means for notifying the called party by using non-voice message that:
  the caller has attempted to call the called party; and
  the caller may be reached via the second communication method.

20. The system of claim 19, further comprising:
means for notifying the caller via the second communication method that the first call involving the called party has terminated;
means for receiving from the caller a second request to communicate with the called party via the first communication method; and
means for connecting the caller to the called party.

21. A system for providing a camp-on service, comprising:
means for receiving from a caller a request to communicate with a called party via a first communication method;
means for notifying the caller that the called party is currently communicating on a first call via the first communication method;
means for receiving from the caller:
  a request to camp-on to the called party;
  an indication outside of a voicemail message that the caller can be reached via a second communication method;
means for determining that the first call involving the called party has terminated;
means for notifying the called party by using non-voice message that the caller has attempted to call the called party;

means for placing the called party on hold;

means for notifying the caller via the second communication method that the called party is available;

means for receiving from the caller a second request to communicate with the called party via the first communication method; and means for connecting the caller to the called party.

22. Computer readable medium comprising computer readable code that, when executed by a processor, is operable to:

receive from a caller a request to communicate with a called party via a first communication method;

notify the caller that the called party is currently communicating on a first call via the first communication method;

receive from the caller:

a request to camp-on to the called party; and an indication outside of a voicemail message that the caller can be reached via a second communication method;

determine that the first call involving the called party has terminated; and wherein the code is further operable to notify the called party by using non-voice message that:

the caller has attempted to call the called party; and the caller may be reached via the second communication method.

23. The medium of claim 22, wherein the code is further operable to:

notify the caller via the second communication method that the first call involving the called party has terminated;

receive from the caller a second request to communicate with the called party via the first communication method; and connect the caller to the called party.

24. Computer readable medium comprising computer readable code that, when executed by a processor, is operable to:

receive from a caller a request to communicate with a called party via a first communication method;

notify the caller that the called party is currently communicating on a first call via the first communication method;

receive from the caller:

a request to camp-on to the called party; and an indication outside of a voicemail message that the caller can be reached via a second communication method;

determine that the first call involving the called party has terminated;

notify the called party by using non-voice message that the caller has attempted to call the called party;

place the called party on hold;

notify the caller via the second communication method that the called party is available;

receive from the caller a second request to communicate with the called party via the first communication method; and connect the caller to the called party.

25. The medium of claim 22, wherein the code is further operable to:

call the caller via the first communication method to connect the caller to the called party; and if the caller does not answer:

notify the caller via the second communication method that the first call involving the called party has terminated;

receive from the caller a second request to communicate with the called party via the first communication method; and connect the caller to the called party;

if the caller answers, connect the caller to the called party.

* * * * *